United States Patent
Sekiya

(10) Patent No.: US 7,575,530 B2
(45) Date of Patent: Aug. 18, 2009

(54) PLANETARY ROLLER TRANSMISSION DEVICE AND VEHICLE COMPRISING SAME

(75) Inventor: Mitsuru Sekiya, Odawara (JP)

(73) Assignee: Mikuni Corporation, Tokyo (JP)

( * ) Notice: Subject to any disclaimer, the term of this patent is extended or adjusted under 35 U.S.C. 154(b) by 0 days.

(21) Appl. No.: 12/073,366

(22) Filed: Mar. 4, 2008

(65) Prior Publication Data

US 2008/0167154 A1 Jul. 10, 2008

Related U.S. Application Data

(63) Continuation of application No. PCT/JP2006/316971, filed on Aug. 29, 2006.

(30) Foreign Application Priority Data

Sep. 6, 2005 (JP) ............................. 2005-257750

(51) Int. Cl.
*F16H 15/48* (2006.01)
(52) U.S. Cl. ..................................... 475/193
(58) Field of Classification Search ...................... None
See application file for complete search history.

(56) References Cited

U.S. PATENT DOCUMENTS

| | | | |
|---|---|---|---|
| 2,403,627 A | * | 7/1946 | Bade .......................... 475/193 |
| 3,357,277 A | * | 12/1967 | Alsch .......................... 475/193 |
| 4,468,984 A | * | 9/1984 | Castelli et al. .............. 475/115 |
| 6,004,239 A | * | 12/1999 | Makino ....................... 475/194 |

FOREIGN PATENT DOCUMENTS

| | | |
|---|---|---|
| JP | 41-25209 | 12/1966 |
| JP | 6-280961 | 10/1994 |
| JP | 9-177920 | 7/1997 |
| JP | 10-274306 | 10/1998 |

OTHER PUBLICATIONS

International Preliminary Report on Patentability, mailed Sep. 18, 2008 and issued in corresponding International Patent Application No. PCT/JP2006/316971.

* cited by examiner

*Primary Examiner*—Dirk Wright

(57) ABSTRACT

A planetary roller transmission device has a rotatable input shaft and an output shaft on the same axis, a plurality of planetary rollers which are rollable around the outer periphery of a sun roller provided on the input shaft, an output ring which is provided integrally with the output shaft, inside which the planetary roller roll, and a shift ring which is provided to be movable in only along the axis and with which the planetary roller internally and rollably contacts. The position at which the sun roller contacts the planetary rollers by pressing the planetary rollers in an outer direction is located between a first position at which the output ring contacts the planetary roller, and a second position at which the shift ring contacts the planetary roller. The planetary roller transmission device also has an axial direction pressing member which moves along the axis due to a centrifugal force caused by the rotation of the input shaft.

17 Claims, 5 Drawing Sheets

PLANETARY ROLLER TRANSMISSION DEVICE AND VEHICLE COMPRISING SAME

CROSS-REFERENCE TO RELATED APPLICATIONS

This application is a continued application filed under 35 U.S.C. §111(a), of International Application PCT/JP 2006/316971 filed Aug. 29, 2006, which claimed priority to Japanese Application No. 2005-257750, filed Sep. 6, 2005, in the Japanese Intellectual Property Office.

BACKGROUND

1. Field

The present inventive concept is directed to a planetary roller transmission device which uses a planetary roller mechanism and to a vehicle which comprises the planetary roller transmission device. More specifically, the inventive concept relates to a planetary roller transmission device, which efficiently transmits large torques, and to a vehicle, which comprises the planetary roller transmission device.

2. Description of the Related Art

Japanese Unexamined Patent Application Publication H6-280961 (Patent Document 1) is an example of a conventional transmission device, which uses a conventional planetary roller mechanism. The conventional planetary roller mechanism is illustrated in FIG. 5.

In FIG. 5, an input shaft 207 is rotatably supported, via a bearing 205, by a flange 203 mounted on one end side of a cylindrical housing 201, and an output shaft 213 is rotatably supported, via a bearing 211, by a flange 209 mounted on the other end side of the housing 201. The input shaft 207 and the output shaft 213 are disposed on the same axis, and the inner end portion of the input shaft 207 is rotatably supported by the output shaft 213 via a bearing 215.

A tapered sun roller 217 is integrally attached, via a key 219, to the inner end side of the input shaft 207, and a plurality of planetary rollers 221 are rollably disposed on the outer periphery of the sun roller 217. The planetary rollers 221 are rotatably supported by holders 225, which are rotatably supported by the input shaft 207 via bearings 223. The planetary rollers 221 internally and rollably contact output rings 227 integrally attached via keys to a cup-shaped inner end side of the output shaft 213.

The plurality of planetary rollers 221 are held rollably through pinching pressure between the sun roller 217 and the output rings 227.

A taper portion 221T is formed on one end side of each planetary roller 221, and the taper portions 221T internally and rollably contact shift rings 229. The shift rings 229 are integrally supported by a movable member 233, which is movably screwed to a screw member 231 that is rotatably supported by the housing 201. Accordingly, the shift rings 229 integrally move in the axial direction of the input shaft 207 and the output shaft 213 when the movable member 233 moves due to the rotation of the screw member 231, and, thus, the contact position of the taper portion 221T on the planetary rollers 221, and the shift rings 229 can be varied.

As is described above, in the conventional planetary roller mechanism, the planetary rollers 221 are pinched between the sun roller 217 and the output rings 227. Therefore, when the contact pressure between the sun roller 217 and the planetary rollers 221 is large, the contact pressure between the planetary rollers 221 and the output rings 227 is also increased, but the contact pressure between the shift rings 229 and the planetary rollers 221 cannot be increased.

Accordingly, it is impractical to improve transmission efficiency in the conventional planetary roller mechanism by increasing the contact pressure between the sun roller 217 and the planetary rollers 221, the contact pressure between the output rings 227 and planetary rollers 221, and the contact pressure between the shift rings 229 and the planetary rollers 221. Moreover, it is difficult to increase the contact pressure between the planetary rollers 221 and the shift rings 229 due to the planetary rollers 221 being cantilever and the taper portions 221T easily bending.

Embodiments of the present inventive concept solve the above problems by providing a planetary roller transmission device and a vehicle comprising the planetary roller transmission device in which the contact pressure of the planetary rollers can be increased relative to the sun roller, the output rings and the shift rings, thereby increasing the transmission efficiency.

SUMMARY

Additional aspects and/or advantages will be set forth in part in the description which follows and, in part, will be apparent from the description, or may be learned by practice of the invention.

A planetary roller transmission device, according to an embodiment of the present inventive concept includes an input shaft which is provided rotatably on an axis, an output shaft provided on the same axis as the input shaft, a sun roller provided on the input shaft, a plurality of planetary rollers which are rollable around an outer periphery of the sun roller, each of the planetary rollers being formed with a taper portion, an output ring which is provided integrally with the output shaft, and inside which the planetary rollers roll; and a shift ring with which the taper portion provided on each of the planetary rollers internally and rollably contacts, and which is provided to be movable in only along the axis of the input shaft and the output shaft. The sun roller, planetary rollers, output ring and shift ring are disposed so that the sun roller contacts the planetary rollers by pressing the planetary rollers in an outer direction at a position located between a first position at which the output ring contacts the planetary roller, and a second position at which the shift ring contacts the planetary roller.

The planetary roller transmission device, according to an embodiment may further include an axial direction pressing member which is movable along the axis of the input shaft due to a centrifugal force caused by the rotation of the input shaft, wherein the sun roller is provided slightly movable in the axial direction of the input shaft, and the sun roller is pressed in the axial direction by the axial direction pressing member, causing the contact pressure between the sun roller and the planetary rollers to increase.

The planetary roller transmission device, according to an embodiment may further include pressing force increasing means provided between the axial direction pressing member and the sun roller; and an elastic member which presses and biases the axial direction pressing member in the axial direction.

The planetary roller transmission device, according to an embodiment may further include a holder which moves freely and rotatably supports both end portions of the planetary rollers.

In the planetary roller transmission device, according to an embodiment, the holder may include a pivot bearing which pivotably supports both end portions of the planetary rollers.

According to another embodiment, a vehicle uses a planetary roller transmission device. The vehicle has an engine, a planetary roller transmission device interlockingly coupled to the engine, the planetary roller transmission device having an output shaft which outputs power from the engine that has been shifted in speed by the planetary roller transmission device, a power transmission wheel provided on the output shaft a power transmission mechanism for transmitting power from the power transmission wheel and a running wheel which rotates when power is transmitted thereto from the power transmission wheel via the power transfer mechanism. The planetary roller transmission device may be the planetary roller transmission device according to any one of the above embodiments.

In the vehicle using a planetary roller transmission device, according to an embodiment, the power transmission mechanism may be at least one of a chain, belt and gear.

Tn the vehicle using a planetary roller transmission device, according to an embodiment, the engine and the planetary roller transmission device may be disposed so that a crankshaft of the engine, and the input and output shafts of the planetary roller transmission device are in parallel.

In the vehicle a planetary roller transmission device, according to an embodiment, the engine and the planetary roller transmission device may be disposed so that a crankshaft of the engine, and the input and output shafts of the planetary roller transmission device are in series.

According to the planetary roller transmission devices or the vehicles using a planetary roller transmission device described above for various embodiments, when the contact pressure between the sun roller and the planetary roller is increased by the sun roller pressing the planetary roller in an outer direction, the output ring and the shift ring, which contact the planetary roller on their inner periphery, on the outer side of the sun roller, receive the pressing of the sun roller, and thus the contact pressure among the sun roller, output ring, shift ring and the planetary roller can be increased, and transmission efficiency is improved.

According to embodiments of vehicles using a planetary roller transmission device, the engine and the planetary roller transmission device are disposed in parallel or in series, thus compact dimensions are achieved in the respective width or the length forward-to-rear of the vehicle.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION OF THE EMBODIMENTS

Figure 1:
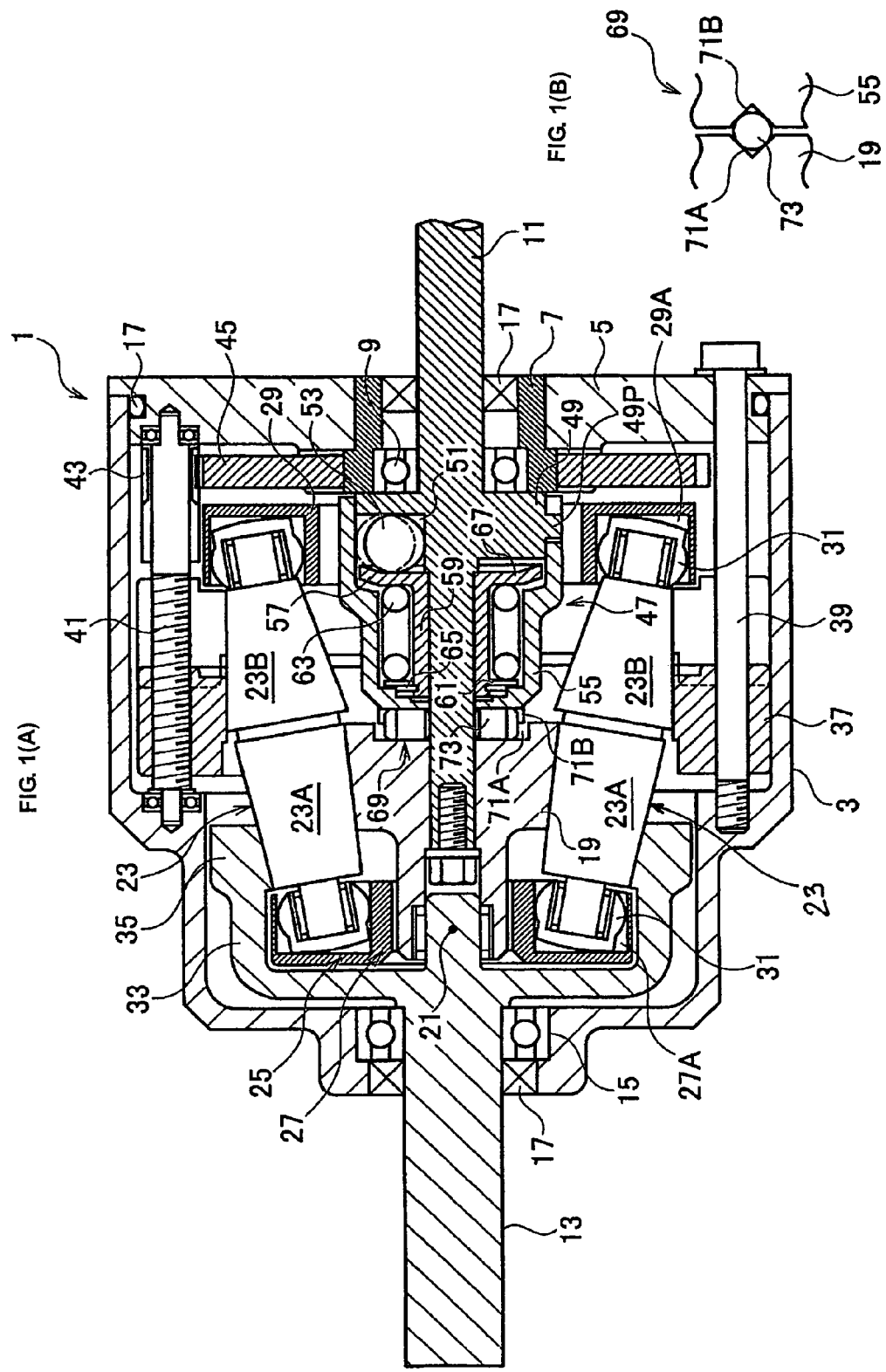
FIG. 1(A) is a cross sectional view of a planetary roller transmission device according to an embodiment of the present inventive concept.
FIG. 1(B) is an enlarged view of a portion of the planetary roller transmission device.

Reference will now be made in detail to the embodiments, examples of which are illustrated in the accompanying drawings, wherein like reference numerals refer to the like elements throughout. The embodiments are described below to explain the present invention by referring to the figures.

Referring to FIG. 1(A), a planetary roller transmission device 1 according to an embodiment of the present inventive concept comprises a hollow housing 3, and a flange member 5 that is attached to an opening portion on one end side of the housing 3, blocking the opening portion. An input shaft 11 is rotatably supported via bearings 9 on cylindrical bearing blocks 7 provided on the center portion of the flange member 5. An output shaft 13 is rotatably supported, via bearings 15, opposite the input shaft 11, on the other end side of the housing 3. Seal members 17 are interposed respectively at a first location between the housing 3 and the flange member 5, the bearing blocks 7 and the input shaft 11, and at a second location between the housing 3 and the output shaft 13. Thereby, the seal members 17 hermetically seal the inner portion of the housing 3.

The input shaft 11 and the output shaft 13 are disposed on the same axis, and a tapered sun roller 19, formed so as to be thinner on the output shaft 13 side thereof, is attached rotatably, as well as slightly movable in the axial direction, to the tip end portion (inner end portion) of the input axis 11. The sun roller 19 integrally rotates with the input shaft 11 so that the rotation of the input shaft 11 is transmitted to the output shaft 13, and a portion of the sun roller 19 is rotatably supported, via a bearing, on an inner end portion 21 of the output shaft 13.

A plurality of planetary rollers 23 are rollably (able to revolve) disposed on the outer periphery of the tapered portion of the sun roller 19. The planetary rollers 23 are disposed at equal intervals inside a virtual tapered surface in which the output shaft 13 side of the sun roller 19 has a small diameter, and the input shaft side 11 of the sun roller 19 has a large diameter. Each planetary roller 23 has a first taper portion 23A and a second taper portion 23B. The first and second taper portions 23A and 23B have smaller diameters on their end portion sides than a diameter at a center portion in the length direction of the respective planetary roller 23. Both end portions of each planetary roller 23 are rotatably supported by holders 25 provided in the housing 3 so as to be move freely, floating.

In more detail, the holders 25 comprise a small diameter ring portion 27, which surrounds the inner end portion 21 of the output shaft 13, and a large diameter ring portion 29, which surrounds the base portion side (the portion opposite the inner end portion) of the input shaft 11. The small diameter ring portion 27 and the large diameter ring portion 29 are integrally linked by a plurality of linking members (not shown in the drawings), and have a truncated cone tubular shape. In other words, the end surface of the small diameter ring portion 27 on the left side in FIG. 1(A) has a surface corresponding to the upper side of a trapezoid and the end surface of the large diameter ring portion 29 on the right side in FIG. 1(A) has a surface corresponding to the base side of a trapezoid. A hallow portion is formed in each of the holders 25 in the portions thereof which dispose the plurality of planetary rollers 23, thus the holders 25 are structured so that interference between the first and second taper portions 23A and 23B of each planetary roller 23 and the holders 25 (the plurality of linking members not shown in the drawings) is avoided.

Concave portions 27A and 29A are respectively formed, in the holders 25, facing each other, on the surfaces thereof in which the small diameter ring portion 27 and the large diameter ring portion 29 oppose each other. Large, substantially spherical, pivot bearings 31, are respectively pivotably housed in each of the concave portions 27A and 29A, and both end portions of the planetary rollers 23 are rotatable supported, via bearings, by the pivot bearings 31.

Accordingly, the planetary rollers 23 can pivot slightly in a direction along the virtual tapered surface in which the planetary rollers 23 are disposed, and in a direction which intersects the virtual tapered surface. However, due to both end portions of the planetary rollers 23 being supported, the large inclination in the direction along the virtual tapered surface, more specifically the large inclination in which one end side of the planetary rollers 23 is set as the fulcrum as appropriate, and the other end side moves in a direction perpendicular to the paper as illustrated in FIG. 1(A), is regulated. In other words, each planetary roller 23 has both end portions supported by the small diameter ring portion 27 and the large diameter ring portions 29 of the holders 25, and a movement of the planetary rollers 23 in the direction of revolution is regulated.

A large cupped portion 33 is provided on the inner end portion 21 side of the output shaft 13 to surround the small diameter ring portion 27 of the holders 25, and output rings 35 with which the first taper portions 23A of the planetary rollers 23 internally and rollably contact, are integrally provided on the inner end portion of the cupped portion 33. In more detail, the sun roller 19 contacts the base portion side of the first taper portions 23A, and the output rings 35 contact the tip end portion side of the first taper portions 23A.

The edge on the outer side of the second taper portions 23B of the planetary rollers 23 is parallel to the axis of the input shaft 11 and the output shaft 13 are disposed, and speed shifts rings 37 contact respective edge portions of the planetary rollers. The shift rings 37 are guided by a plurality of bolt-like guide members 39, which tighten and fasten the flange member 5 to the housing 3, and are provided movably in a direction parallel to the axis of input shaft 11 and the output shaft 13. In order to move the shift rings 37 along the guide members 39, a plurality of screw members 41, which are parallel to the guide members 39, are provided in the housing 3, and the shift rings 37 are movably fastened using the screw members 41.

In order to simultaneously rotate the plurality of screw members 41, a pinion gear 43 is integrally attached on one end side of each screw member 41, respectively, and each of the pinion gears 43 is fastened to large diameter intermediate gears 45, which are rotatably supported by the bearing blocks 7. Accordingly, when a certain screw member 41 is rotated via a handle (not shown in the drawings), all of the plurality of screw members 41 simultaneously rotate. Hence, the shift rings 37 fastened to the screw members 41, move along the guide members 39, and the contact position of the shift rings 37 to the second taper portions 23B of the planetary rollers 23, can be varied. Note that the movement position of the shift rings 37 can be detected as appropriate by position detection sensors (not shown in the drawings), such as rotary encoders, interlockingly coupled with the screw members 41.

The centrifugal force caused by the rotation of the input shaft 11 causes the sun roller 19 to move slightly in the axial direction, and sun roller pressing means 47 is provided in order to improve the transmission efficiency by increasing the contact pressure between the planetary rollers 23 and the sun roller 19.

In more detail, a large diameter portion 49 is formed on the base portion side of the input shaft 11, within the housing 3. A plurality of long grooves 51 are formed at equal intervals on the outer periphery of the large diameter portion 49, the long grooves 51 being open to the sun roller 19 side and prolonged in the diameter direction thereof (radial direction). A bowl-shaped, roller-shaped or the like movable body 53 is movably provided inside each long groove 51. In order to regulate movement of the movable bodies 53 in directions other than the radial direction (diameter direction), an axial direction pressing member 55, which covers the outer periphery of the large diameter portion 49 and which has a cup or tubular shape, integrally rotates engaged to a protrusion portion 49P formed on the large diameter portion 49, and is provided movably in the axial direction.

In the inner portion of the axial direction, a movable sleeve 59 is fitted movably on the input shaft 11 pressing a member 55. The movable sleeve 59 comprises, on the base end portion side thereof, a disc-shaped spring base 57, which is in pressure contact with the movable body 53 due to the rotation of the input shaft 11. A movable ring 61, which abuts?? the tip end side inner surface of the axial direction pressing member 55, is movably fitted into the movable sleeve 59, and an elastic member 63, such as a coil spring, is provided in a compressed state between the movable ring 61 and the spring base 57. A small diameter stopper ring 65 is integrally mounted on the tip end portion of the movable sleeve 59 in order to prevent the movable ring 61 from slipping.

A cam surface 67, which is pressed by the movable body 53, is formed on the contact surface on which the spring base 57 contacts the movable body 53. The cam surface 67 is inclined so that the spring base 57 moves due to pressure generated by the centrifugal force so that the movable body 53 moves in the outer direction. In other words, the cam 67 is inclined to contact in the proximity of the large diameter portion 49 side towards the outer periphery side of the spring base 57.

A pressing force increasing means 69 is provided on a portion at which the axial direction pressing member 55 presses against the sun roller 19. FIG. 1(B) is an enlarged front view of the pressing force increasing means 69 portion. In greater detail, grooves 71A and 71B are formed in the diameter direction (radial direction) on the respective surfaces in which the sun roller 19 and the axial direction pressing member 55 face each other, and a force transmission member 73, such as a bowl or a roller, is provided inside the grooves 71A and 71B. At least one of the grooves 71A and 71B, as is shown in FIG. 1(B), is formed as a V-shaped groove comprising an inclined surface. Moreover, occurrence of an eccentric load is prevented by forming a radial shape on the grooves 71A and 71B at a plurality of locations (for example, two to six locations).

In the structure described above, the sun roller 19 contacts the planetary rollers 23 in a substantial center portion in the length direction so that the planetary rollers 23 are pressed from the inside in the outer direction. The output rings 35 and the shift rings 37 contact both of the end portion sides of the planetary rollers 23 so that the movement of the planetary rollers 23 in the outer direction is controlled. In other words, the force exerted by the sun roller 19 pressing the planetary rollers 23 around the center portion in the outer direction, and the force exerted by the output rings 35 and the shift rings 37 pressing both end sides of the planetary rollers 23 in the inner direction, are equal.

Accordingly, when the contact pressure between the sun roller 19 and the planetary rollers 23 is increased, the contact pressure between the output rings 35 and shift rings 37, and the planetary rollers 23 is also increased, and the transmission efficiency is improved by increasing the contact pressure.

In the structure described above, when the input shaft 11 rotates, the sun roller 19 integrally rotates with the input shaft 11 via the movable bodies 53, the force transmission members 73 and the like. Accordingly, the planetary rollers 23 which rotatably contact the outer periphery of the sun roller 19, rotate (around the respective axes thereof) in accordance with the sun roller 19. The planetary rollers 23 internally and rollably contact the shift rings 37 which cannot move in the rotation direction, thus the planetary rollers 23 roll (revolve) along the shift rings 37.

When the shift rings 37 contact the center position on the second taper portion 23B of the planetary rollers 23 (the contact position illustrated in FIG. 1(A)), the output shaft 13 is stopped and the output is zero. Then, when the shift rings 37 move to the right in FIG. 1(A), the contact positions of the shift rings 37 move to the small diameter portion side of the second taper portions 23B of the planetary rollers 23. Thus, while the planetary rollers 23 rotate (around the respective axes thereof), the speed with which they roll (revolve) along the shift rings 37 is gradually increased, thus the speed of the output shaft 13 also gradually increases. When the shift rings 37 move to the left from the center position, the output shaft 13 rotates in reverse.

As described above, when the input shaft 11 rotates to gradually reach a high speed, the movable bodies 53 provided in the large diameter portion 49 of the input shaft 11 gradually move in an outer radial direction due to centrifugal force. When the movable bodies 53 move in the outer direction along the long grooves 51, the movable bodies 53 act on the cam surface 67 formed on the spring base 57 in the movable sleeve 59, pressing the movable sleeve 59 in the left direction of FIG. 1(A). This pressing force is transmitted to the axial direction pressing member 55 via the elastic member 63 and the movable ring 61.

Then the pressing force exerted on the axial direction pressing member 55 is transmitted to the sun roller 19 via the force transmission member 73. The force transmission member 73 is interposed between the groove 71A formed on the sun roller 19 and the groove 71B formed on the axial direction pressing member 55, and is moved to the side of the sun roller 19 by the inclined surface of the groove 71B. At this time, the inclined surfaces of the grooves 71A and 71B have a wedge effect, and, thus, a big pressing force is generated. Note that, in order to exhibit a wedge effect, it is desirable that the apexes of the grooves 71A and 71B form an obtuse angle, and that the inclined surfaces of the grooves 71A and 71B are gently inclined. In this manner, the pressing force on the sun roller 19 in the axial direction is increased due to the wedge effect.

Accordingly, as the contact pressure between the sun roller 19 and the planetary rollers 23 increases, the contact pressure between the output rings 35 and the shift rings 37 in relation to the planetary rollers 23 increases, thus ensuring the necessary contact pressures. As the rotation of the input shaft 11 reaches higher speeds and the centrifugal force increases, the movable bodies 53 gradually move in the outer direction and gradually press the movable sleeve 59 to the left of FIG. 1(A) with a larger force. When the force pressing the movable sleeve 59 becomes equal to or greater than a fixed load of the elastic member 63, the elastic member 63 is substantially compressed. Then, when the rotation of the input shaft 11 reaches even higher speeds, the movement of the movable bodies 53 in the outer direction is regulated by the axial direction pressing member 55.

More specifically, when the rotation speed of the input shaft 11 increases, even if the centrifugal force acting on the movable bodies 53 increases more than necessary, the pressing force exerted on the sun roller 19 in the axial direction does not exceed a certain limit. More specifically, the contact pressure between the sun roller 19 and the planetary rollers 23 does not exceed the necessary contact pressure.

When the rotation of the input shaft 11 slows, and thus the centrifugal force acting on the movable bodies 53 decreases, the movable bodies 53 move in an inner direction due to the bias of the elastic member 63 and the effect of the cam surface 67 of the spring base 57. Accordingly, the pressing force which presses the sun roller 19 decreases, and slipping occurs between the sun roller 19 and the planetary rollers 23, therefore interrupting the transmission of force to the output shaft 13. Thus, one type of clutch function is performed. Since the clutch disengages due to the lower rotation speed of the input shaft 11 regardless of the position of the shift rings 37, safety is improved.

Figure 2:
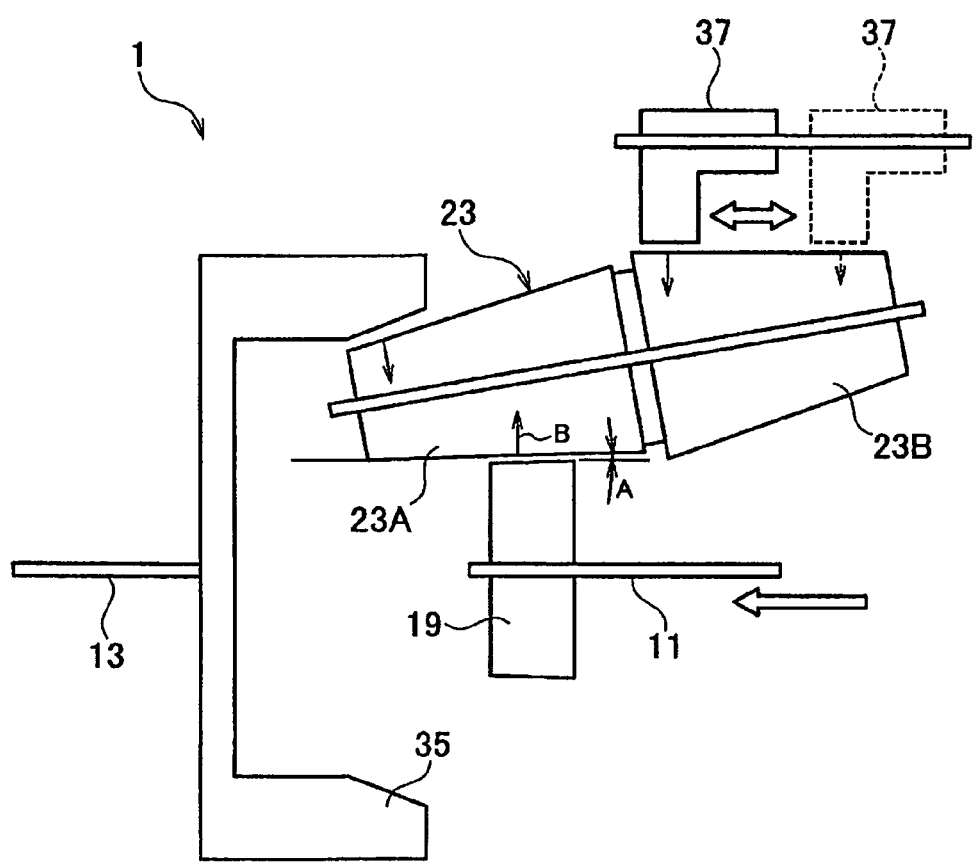
FIG. 2 is a view schematically illustrating the main portion in FIG. 1(A)

FIG. 2 shows an outline of the main structure of the planetary roller transmission device 1. As illustrated in FIG. 2, the sun roller 19 contacts the planetary roller 23 on its inner side and at the substantially center position of the planetary roller 23, and the output ring 35 and the shift ring 37 contact the planetary roller 23 on the outer side and at both end sides of the planetary roller 23. More specifically, the sun roller 19 contacts the planetary roller 23 at a position in the middle of the positions at which the output ring 35 and the shift ring 37 contact the planetary roller 23. Thus, balance is achieved due to three points of support. The pressure force of the sun roller 19 pressing the planetary roller 23 in an outer direction is absorbed by the output ring 35 and the shift ring 37. The size of the gap between the sun roller 19 and the output ring 35 being substantially constant, in order to change gear ratios, the shift ring 37 moves in the axial direction.

In order to change the rotation speed of the output shaft 13 from high to low, the shift ring 37 is moved from the small diameter portion side to the large diameter portion side of the second taper portion 23B of the planetary roller 23, so that the shift ring 37 approaches the sun roller 19. Accordingly, the size of the gap between the sun roller 19 and the shift ring 37 become smaller, increasing the contact pressure between the planetary roller 23 and the shift ring 37 due to momentum. More specifically, a bigger torque transmission is necessary proportional to a big deceleration ratio, but since the contact pressure of the shift ring 37 is high, transmission of large torques is carried out with greater certainty.

As described above, the contact pressure between the sun roller 19 and the planetary roller 23 is obtained by the slight movement of the sun roller 19 in the axial direction. Therefore, it is desirable to use a wedge effect to increase the contact pressure. In this case, it is desirable that a wedge angle A between the input shaft 11 and the edge, at which the sun roller 19 and the planetary roller 23 contact, of the first taper portion 23A, to be approximately five to eight degrees.

More specifically, when the wedge angle A is small, the contact pressure (the force in the direction shown by an arrow B) between the sun roller 19 and the planetary roller 23 is high. However, when the wedge angle A is about five degrees or less, a biting phenomenon arises between the sun roller 19 and the planetary roller 23 due to the big wedge effect, the sun roller 19 cannot return, the clutch function is not exhibited, and, thus, the result is undesirable. Moreover, when the wedge angle A is about eight degrees or greater, it is necessary to apply a bigger pressing force to press the sun roller 19 in the axial direction in order to increase the contact pressure between the sun roller 19 and the planetary roller 23, and, thus, the result is undesirable.

As explained above, when the contact pressure between the sun roller 19 and the planetary roller 23 is increased due to slightly moving the sun roller 19 in the axial direction, the contact pressure between the output rings 35 and shift rings 37, and the planetary rollers 23 is increased, which improves the transmission efficiency because of the increased contact pressure exerted on each portion. Moreover, when the pressing force on the sun roller 19 in the axial direction is decreased, slipping occurs between the sun roller 19 and the planetary roller 23, thus interrupting transmission of the rotation of the sun roller 19 to the planetary roller 23. Thus, safety is improved due to the ability to perform the clutch function.

Moreover, with the above structure, the slight movement of the sun roller 19 in the axial direction causes the contact pressure between the sun roller 19 and the planetary roller 23 to decrease thus interrupting the transmission of force to the output shaft 13. Thus the clutch function is performed and the output shaft can rotate when the rotation of the input shaft 11 is low or zero. In a vehicle having a drive source such as an engine and running wheels, a planetary roller transmission device is used to transmit the power the drive source to the running wheels.

Note that it is desirable to select the number of planetary rollers 23 in accordance with the output of the engine, for example, three to six planetary rollers. Most desirable is to have three planetary rollers.

Next, an embodiment of a vehicle the planetary roller transmission device 1 according to the present inventive concept is described, with reference to the drawings. The same notation is used for the parts that are identical to those in the above-described planetary roller transmission device 1, and the description of those identical parts is omitted.

Figure 3:
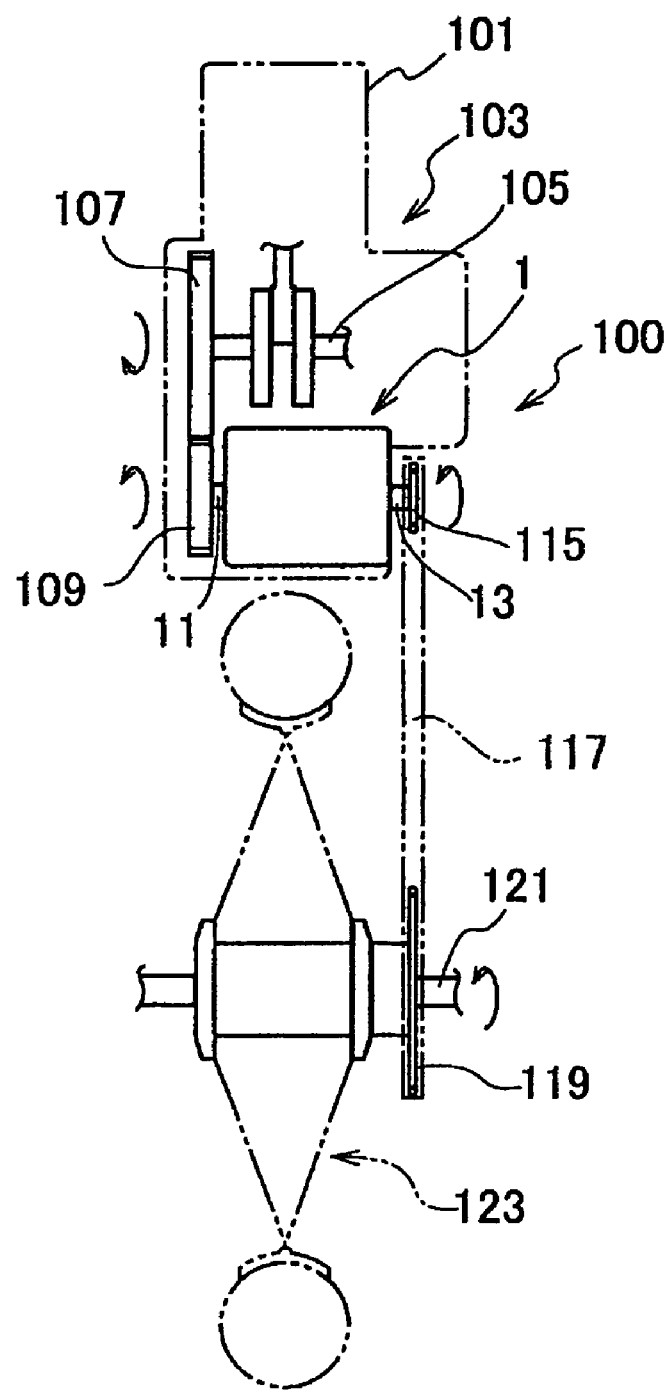
FIG. 3 is a cross sectional view of a portion of a vehicle, which includes the planetary roller transmission device according to an embodiment of the present inventive concept.

FIG. 3 illustrates a vehicle 100 in which a crankshaft 105 of an engine 103, the input shaft 11 and the output shaft 13 of the planetary roller transmission device 1 are provided in parallel. The rotation drive force is transmitted from the crankshaft 105 provided in a casing 101 of the engine 103 to the input shaft 11 via gears 107 and 109. The rotation drive force transmitted first to the input shaft 11 is transmitted to the output shaft 13 after being shifted in speed as appropriate by the planetary roller transmission device 1. A power transmission wheel 115 is provided on the output shaft 13, and rotation drive force is transmitted from the output shaft 13 to running wheels 123 via power transmission mechanisms 117, 119 and 121. The power transmission mechanism may be a chain, a belt or a gear.

In this embodiment, the crankshaft 105 of the engine 103, the input shaft 11 and the output shaft 13 of the planetary roller transmission device 1 are provided in parallel, which design saves space since the dimensions in the width direction (left to right in FIG. 3) of the vehicle 100 can be designed to be small. Although in this embodiment, the planetary roller transmission device 1 is provided in the inner portion of the casing 101 of the engine 103, it is also possible to provide the planetary roller transmission device 1 outside the casing 101.

Figure 4A:
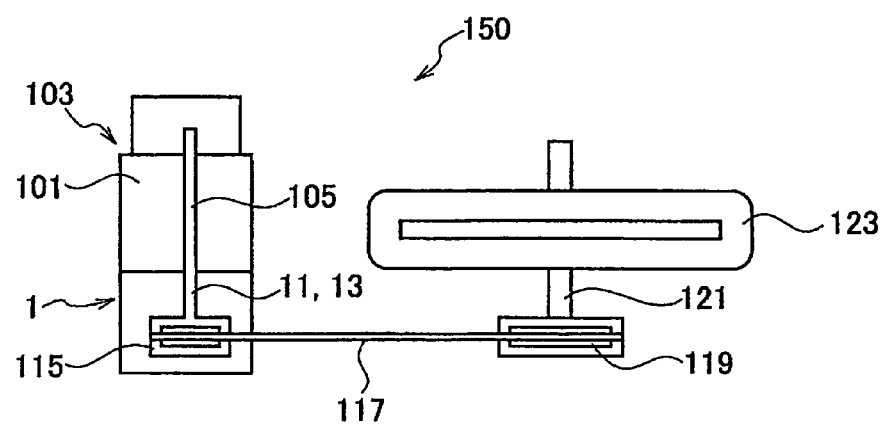
FIGS. 4(A) and 4(B) are views schematically illustrating an improved portion of a vehicle, which includes the planetary roller transmission device according to an embodiment of the present inventive concept, FIG. 4(A) representing a plan view and FIG. 4(B) representing a front view.
Figure 4B:
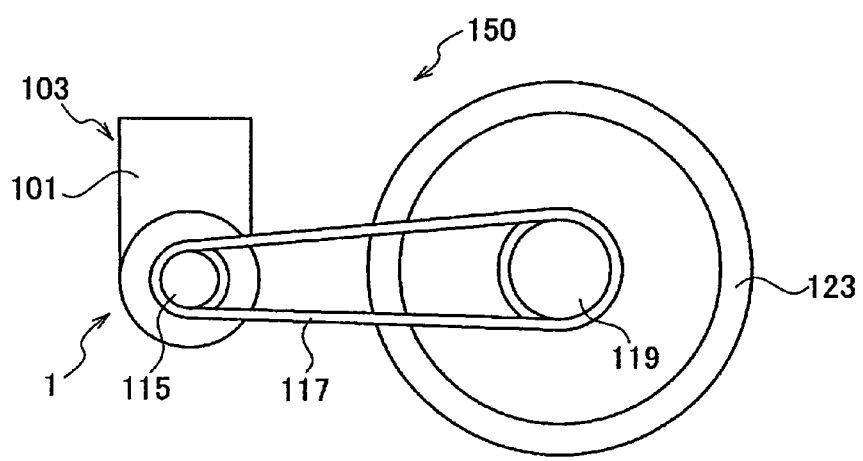
Figure 5:
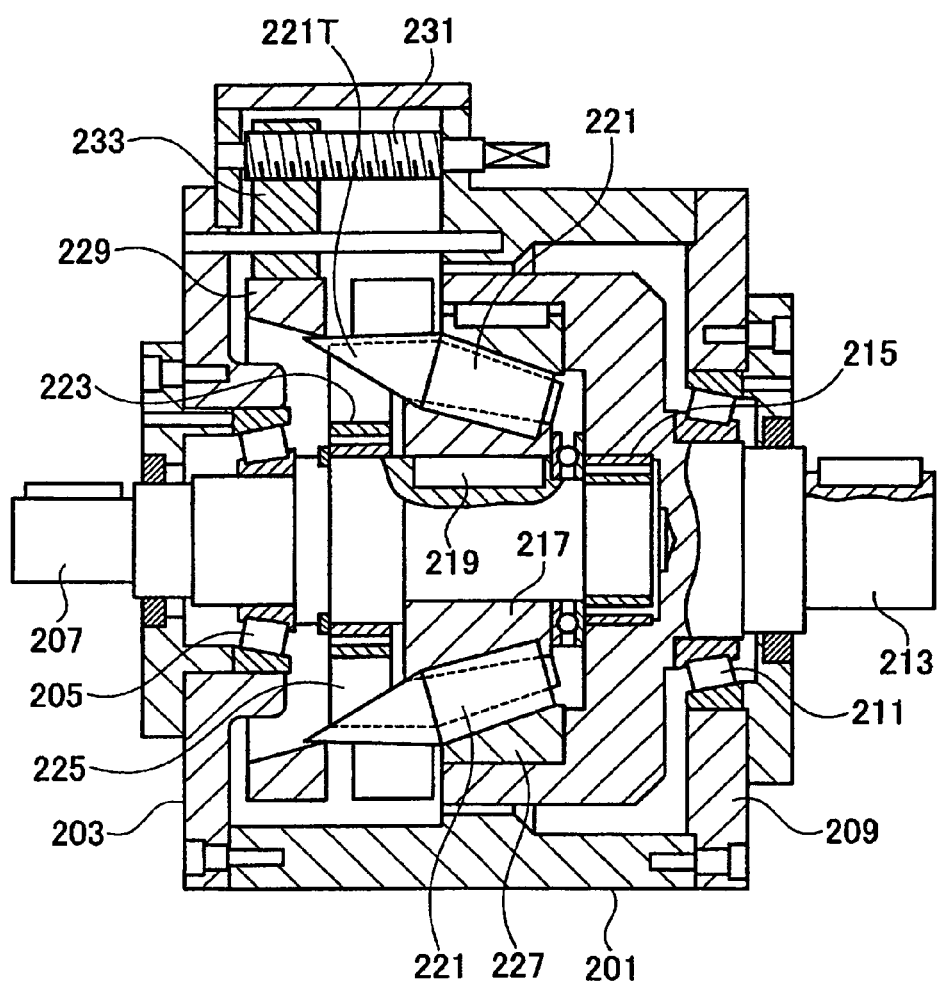
FIG. 5 is a cross sectional view of a conventional planetary roller device.

Another embodiment of the present inventive concept is a vehicle 150 illustrated and describe in reference to FIGS. 4(A) and 4(B). The same notation is used for the parts that are identical to those described above relative to the vehicle 100, and the description of those identical parts is omitted. in the vehicle 150, the crankshaft 105 of the engine 103, the input shaft 11 and the output shaft 13 of the planetary roller transmission device 1 are provided in series. Since the crankshaft 105, and the input shaft 11 and the output shaft 13 are provided in series, the engine 103 and the planetary roller transmission device 1 are also provided in series in the width direction of the vehicle 150. This design saves space since the dimensions in the front-to-rear direction (left to right in FIGS. 4(A) and 4(B)) of the vehicle 150 can be designed to be small.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A planetary roller transmission device, comprising:
   an input shaft which is provided rotatably on an axis;
   an output shaft provided on the same axis as the input shaft;
   a sun roller provided on the input shaft;
   a plurality of planetary rollers which are rollable around an outer periphery of the sun roller, each of the planetary rollers being formed with a taper portion;
   an output ring which is provided integrally with the output shaft, and inside which the planetary rollers roll; and
   a shift ring with which the taper portion provided on each of the planetary rollers internally and rollably contacts, and which is provided to be movable in only along the axis of the input shaft and the output shaft, wherein
   the sun roller, planetary rollers, output ring and shift ring being disposed so that the sun roller contacts the planetary rollers by pressing the planetary rollers in an outer direction away from the axis at a position located between a first position at which the output ring contacts the planetary roller, and a second position at which the shift ring contacts the planetary roller.

2. The planetary roller transmission device according to claim 1, further comprising:
   an axial direction pressing member which is movable along the axis of the input shaft due to a centrifugal force caused by rotation of the input shaft,
   the sun roller is provided slightly movable in the axial direction of the input shaft, and
   the sun roller is pressed along the axis by the axial direction pressing member, causing an increase of a contact pressure between the sun roller and the planetary rollers.

3. The planetary roller transmission device according to claim 2, further comprising:
   pressing force increasing unit provided between the axial direction pressing member and the sun roller; and
   an elastic member which presses and biases the axial direction pressing member along the axis.

4. The planetary roller transmission device according to claim 3, further comprising:
   a holder which moves freely and rotatably supports both end portions of the planetary rollers.

5. The planetary roller transmission device according to claim 4, wherein
   the holder comprises a pivot bearing which pivotably supports both end portions of the planetary rollers.

6. The planetary roller transmission device according to claim 1, wherein each planetary roller has a first tapper portion and a second tapper portion having smaller diameters on end portions of the planetary roller than in a center portion.

7. The planetary roller transmission device according to claim 1, wherein a wedge angle between the input shaft and an edge, at which the sun roller and the planetary roller contact, is approximately five to eight degrees.

8. The planetary roller transmission device according to claim 1 comprising three to six planetary rollers.

9. A vehicle comprising:
   an engine;

a transmission device interlockingly coupled to the engine;
a power transmission mechanism; and
a running wheel, wherein
the transmission device includes a planetary roller transmission device according to claim 1,
the output shaft of the transmission device has a power transmission wheel, and
power from the power transmission wheel is transmitted to the running wheel via the power transmission mechanism.

10. The vehicle according to claim 9, wherein
the power transmission mechanism is at least one of a chain, a belt and a gear.

11. The vehicle according to claim 9, wherein
the engine and the planetary roller transmission device are disposed so that a crankshaft of the engine, and the input and output shafts of the planetary roller transmission device are in parallel.

12. The vehicle according to claim 9, wherein
the engine and the planetary roller transmission device are disposed so that a crankshaft of the engine, and the input and output shafts of the planetary roller transmission device are in series.

13. The vehicle according to claim 9, wherein the planetary roller transmission device further comprises:

an axial direction pressing member which is movable along the axis of the input shaft due to a centrifugal force caused by rotation of the input shaft,
the sun roller being provided slightly movable in the axial direction of the input shaft, and
the sun roller being pressed along the axis by the axial direction pressing member, causing an increase of a contact pressure between the sun roller and the planetary rollers.

14. The vehicle according to claim 13, wherein the planetary roller transmission device further comprises:
pressing force increasing unit provided between the axial direction pressing member and the sun roller; and
an elastic member which presses and biases the axial direction pressing member along the axis.

15. The vehicle according to claim 14, wherein the planetary roller transmission device further comprises:
a holder which moves freely and rotatably supports both end portions of the planetary rollers.

16. The vehicle according to claim 15, wherein the holder comprises a pivot bearing which pivotably supports both end portions of the planetary rollers.

17. The vehicle according to claim 9, wherein a number of planetary rollers is correlated with a power of the engine.

* * * * *